(12) United States Patent
Hochstetler et al.

(10) Patent No.: US 11,054,012 B2
(45) Date of Patent: Jul. 6, 2021

(54) GENERATOR DRIVEN GEAR FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 193 days.

(21) Appl. No.: 15/862,115

(22) Filed: Jan. 4, 2018

(65) Prior Publication Data
US 2019/0203821 A1    Jul. 4, 2019

(51) Int. Cl.
| | |
|---|---|
| F16H 55/08 | (2006.01) |
| F16H 55/17 | (2006.01) |
| F02C 7/36 | (2006.01) |
| F02C 7/32 | (2006.01) |

(52) U.S. Cl.
CPC .............. *F16H 55/08* (2013.01); *F02C 7/36* (2013.01); *F16H 55/17* (2013.01); *F02C 7/32* (2013.01); *F05D 2260/4031* (2013.01)

(58) Field of Classification Search
CPC ..... F16H 55/08; F02C 7/36; F05D 2260/4031
See application file for complete search history.

(56) References Cited

U.S. PATENT DOCUMENTS

| | | | |
|---|---|---|---|
| 5,832,780 A * | 11/1998 | Gallienne | F16H 1/16 74/425 |
| 8,890,350 B2 * | 11/2014 | Brust | F02C 7/36 290/52 |
| 9,057,372 B2 * | 6/2015 | Wakefield | F04C 2/084 |
| 2010/0283343 A1 * | 11/2010 | Brust | F16H 55/0806 310/83 |
| 2013/0068057 A1 * | 3/2013 | Grosskopf | F16H 1/26 74/414 |
| 2014/0008170 A1 | 1/2014 | Vanderzyden et al. | |
| 2015/0233460 A1 * | 8/2015 | Brust | F16H 55/08 310/90 |
| 2015/0236565 A1 * | 8/2015 | Brust | H02K 7/08 310/90 |
| 2016/0290470 A1 * | 10/2016 | Lemmers, Jr. | B64D 41/00 |
| 2016/0299462 A1 | 10/2016 | Buchanan et al. | |

OTHER PUBLICATIONS

American Gear Manufacturers Association, ANSI/AGMA 1012-G05 American National Standard Gear Nomenclature, Definition of Terms with Symbols, pp. 16, 19-20, and 35. (Year: 2011).*
European Search Report for EP Application No. 19150187.3 dated Mar. 26, 2019.

* cited by examiner

*Primary Examiner* — Randell J Krug
(74) *Attorney, Agent, or Firm* — Carlson, Gaskey & Olds, P.C.

(57) ABSTRACT

A generator driven gear for use in an integrated drive generator has a gear body extending between a first end and a second end and having a disc extending radially outwardly. A boss extends from the disc toward the second end. There are outer gear teeth outwardly of an outer diameter of the disc. The outer gear teeth having a unique gear tooth profile with roll angles A, B, C, and D. An integrated drive generator and a method are also disclosed.

2 Claims, 2 Drawing Sheets

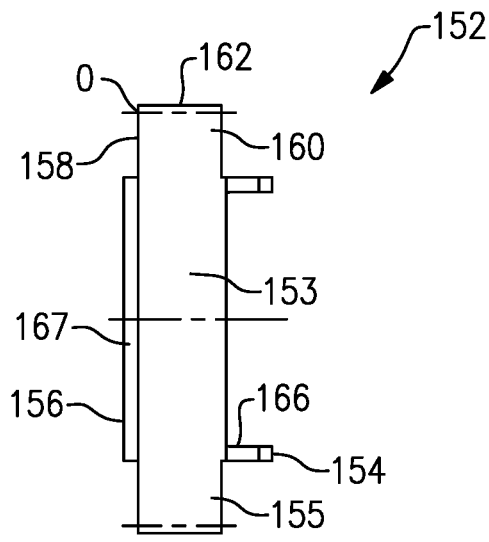
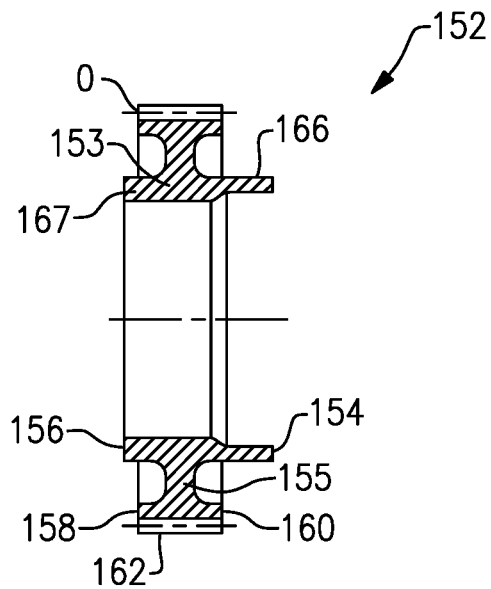
FIG.2A  FIG.2B
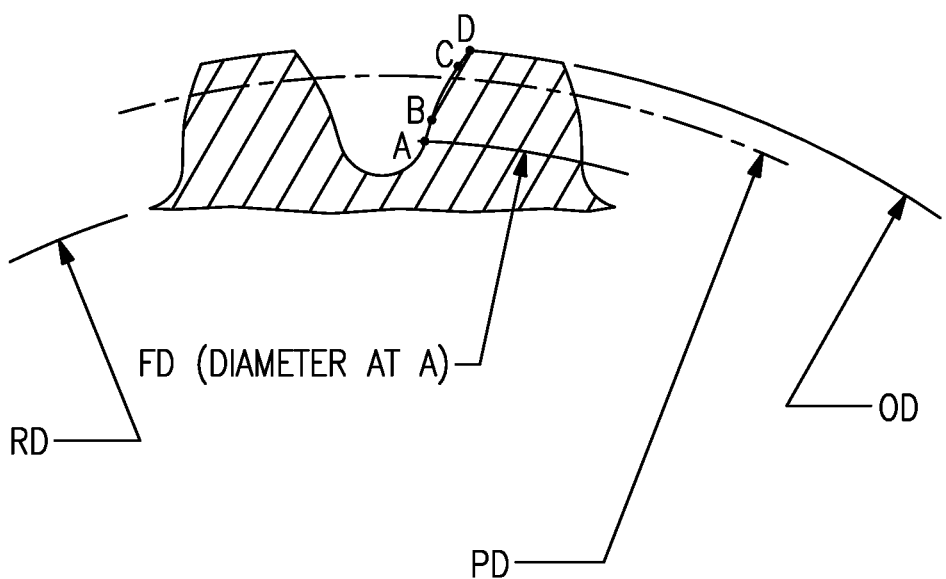
FIG.2C

GENERATOR DRIVEN GEAR FOR INTEGRATED DRIVE GENERATOR

BACKGROUND

This application relates to a generator driven gear for an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator and its generator driven gear to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the output ring gear of the differential through an accessory drive gear. Two such pumps are scavenge and charge pumps. A drive gear drives these pumps.

The generator driven gear must successfully provide rotational input to a generator rotor. There are challenges with regard to this driven gear.

SUMMARY

A generator driven gear for use in an integrated drive generator has a gear body extending between a first end and a second end and having a disc extending radially outwardly of a boss that extends between the first and second ends. There are outer gear teeth outwardly of an outer diameter of the disc. The outer gear teeth having a unique gear tooth profile with roll angles A, B, C, and D. An integrated drive generator and a method are also disclosed.

In addition, an integrated drive generator is disclosed as is a method of replacing a generator drive gear in an integrated drive generator.

These and other features may be best understood from the following drawings and specification.

BRIEF DESCRIPTION OF THE DRAWINGS

FIG. 2A shows a generator driven gear.
FIG. 2B shows a cross-sectional view.
FIG. 2C shows a gear tooth profile.

DETAILED DESCRIPTION

Figure 1:
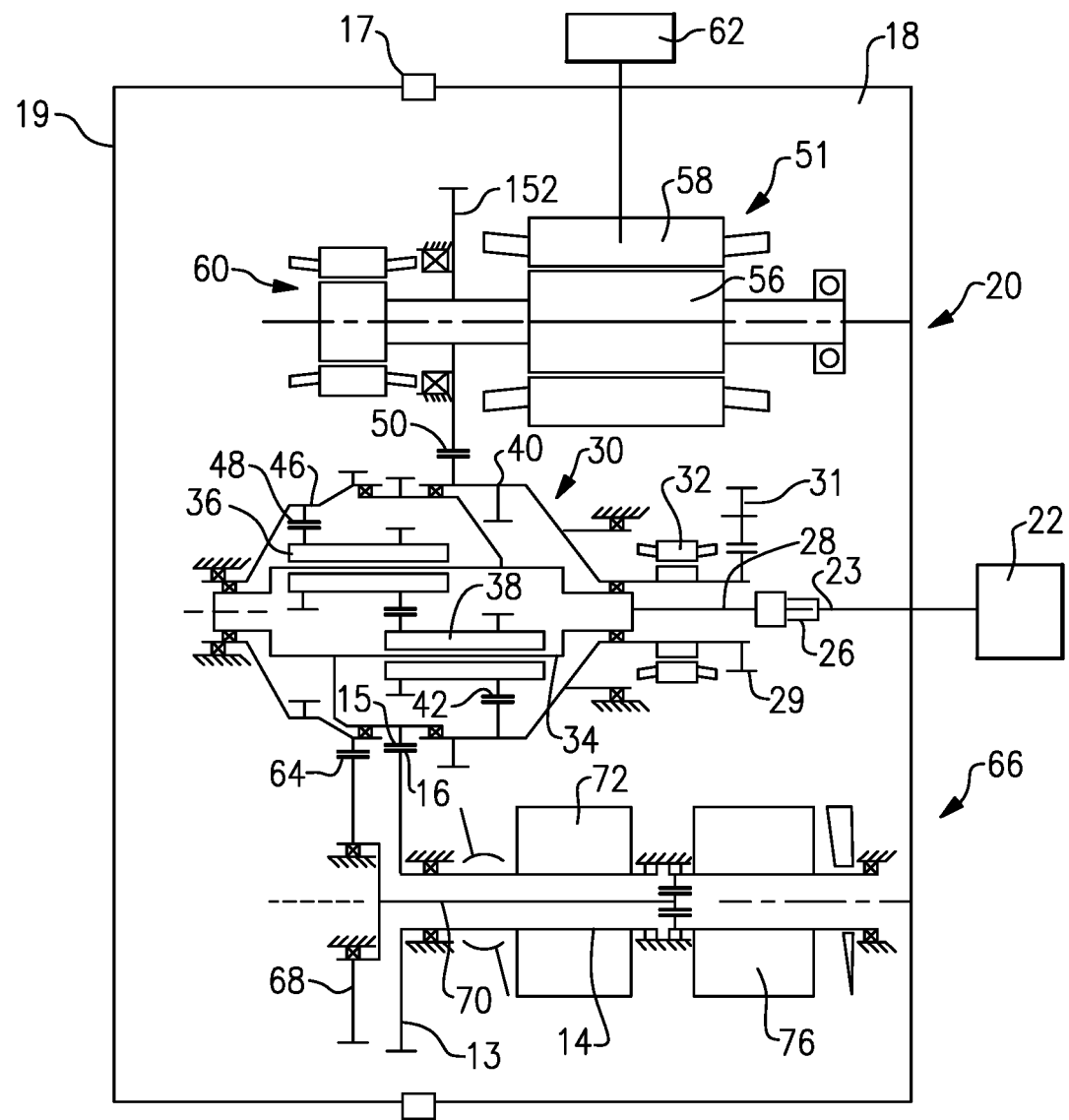
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 and its driven gear 152. When driven gear 152 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 152 to be relatively constant and at the desired speed. As such, the speed of the input shaft 23 is added to the speed of the speed trimmer 66 to result in a constant input speed to gear 152.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 152 will also be too high, and hence, the speed trimmer 66 acts to lower the speed of the trim gear 46 which will drop the speed of gear 152. On the other hand, if the input speed is too low, the speed trimmer will increase the trim gear speed and the speed seen by gear 152 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive gear 29 rotates with the ring gear 40 and drives a plurality of accessory gears 31.

The operation of the integrated drive generator 20 is generally as known in the art. The generator driven gear 152 is unique as set forth below. A worker of ordinary skill would recognize that the desired frequency and speed at use 62 would dictate a number of design functions.

FIGS. 2A and 2B show the generator driven gear 152 having a body 153 extending from a first end 154 to a second end 156. An enlarged disc 155 extends outwardly of a boss 167 extending between the disc 155 and the second end 156. Disc 155 has outer gear teeth 162 at an outer diameter O of disc 155. A pair of tabs extend from the enlarged disc 155 to the first end 154. Teeth 162 are driven by the ring gear, as mentioned above.

FIG. 2C shows a profile of gear teeth 162. The gear teeth have a pitch diameter PD. In one embodiment, the pitch diameter is 3.50 inches (8.89 centimeters). This and all dimensions have a tolerance of +/− the 0.01 inch (0.025 centimeter).

A maximum form diameter FD is 3.40 inches (8.64 centimeters).

As known in the gear tooth art, the profile of the gear teeth is defined by roll angles at points A, B, C, and D. It should be understood specific roll angles of this disclosed gear are novel. All that is known in the art is the specific location of the points A-D. In a disclosed embodiment, the roll angle at A was 14.95 degrees and in embodiments between 14.2 and 15.7 degrees. The roll angle at B was 16.96 degrees and in embodiments between 16.2 and 17.7 degrees. The roll angle at C was 23.01 degrees and in embodiments between 22.3 and 23.8 degrees. The roll angle at D was 25.03 degrees and in embodiments between 24.3 and 25.8 degrees.

The roll angle at A may be applied at the form diameter FD. Thus, the diameter FD of 3.40 inches (8.64 centimeters) corresponds to a diameter at A. The roll angle at B is 20 percent away from roll angle A and between roll angle A and roll angle D. The roll angle at C is 80 percent away from roll angle A and between roll angle A and roll angle D. The roll angle at D is at the outer diameter of the gear tooth.

In embodiments, there are 70 gear teeth 162.

A method of replacing a generator driven gear includes removing an existing generator driven gear from an integrated drive generator. The integrated drive generator has an input shaft and a gear differential including a carrier shaft. The gear differential includes a ring gear connected to the existing generator driven gear. The method also includes the step of replacing the existing generator driven gear with a replacement generator driven gear. The replacement generator driven gear includes a gear body extending between a first end and a second end and having a disc extending radially outwardly of a boss that extends between the first and second ends. Outer gear teeth are formed outwardly of an outer diameter of the disc. The outer gear teeth have a gear tooth profile with roll angles A, B, C, and D, and the roll angle at A being between 14.2 and 15.7 degrees, the roll angle at B being between 16.2 and 17.7 degrees, the roll angle at C being between 22.3 and 23.8 degrees, and the roll angle at D being between 24.3 and 25.8 degrees.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A generator driven gear for use in an integrated drive generator comprising:

a gear body extending between a first end and a second end and having a disc extending radially outwardly of a boss that extends to said second end, with a pair of tabs extending from the disc to said first end, there being outer gear teeth outwardly of an outer diameter of said disc, said outer gear teeth having a gear tooth profile with roll angles at A, B, C, and D, the roll angle at A is 14.95 degrees, the roll angle at B begins 20 percent away from the roll angle A and is 16.96 degrees, the roll angle at C is 80 percent away from the roll angle A and is 23.01 degrees, and the roll angle at D is at an outer diameter of the gear tooth and is 25.03 degrees;

wherein said outer gear teeth have a pitch diameter of 3.50 inches (8.89 centimeters) with a tolerance of +/−0.01 inches (0.025 centimeters);

wherein there are 70 of said outer gear teeth; and wherein said outer gear teeth have a diameter at A of 3.40 inches (8.64 centimeters) with a tolerance of +/−0.01 inches (0.025 centimeters).

2. An integrated drive generator comprising:

an input shaft, a gear differential including a carrier shaft connected to said input shaft and including a ring gear connected to a generator driven gear;

said generator driven gear comprising a gear body extending between a first end and a second end and having a disc extending radially outwardly of a boss that extends to said second end, with a pair of tabs extending from the disc to said first end, there being outer gear teeth outwardly of an outer diameter of said disc, said outer gear teeth having a gear tooth profile with roll angles at A, B, C, and D, the roll angle at A is 14.95 degrees, the roll angle at B begins 20 percent away from the roll angle A and is 16.96 degrees, the roll angle at C is 80 percent away from the roll angle A and is 23.01 degrees, and the roll angle at D is at an outer diameter of the gear tooth and is 25.03 degrees;

wherein said outer gear teeth have a pitch diameter of 3.50 inches (8.89 centimeters) with a tolerance of +/−0.01 inches (0.025 centimeters);

wherein there are 70 of said outer gear teeth;

wherein said outer gear teeth have a diameter at A of 3.40 inches (8.64 centimeters) with a tolerance of +/−0.01 inches (0.025 centimeters);

said generator driven gear being connected to a rotor in a main generator, said rotor being associated with a stator of said main generator; and an accessory drive gear connected to rotate by said ring gear, said accessory drive gear driving at least one accessory gear.

* * * * *